United States Patent [19]

Uetani

[11] Patent Number: 4,682,342
[45] Date of Patent: Jul. 21, 1987

[54] SIGNAL TRANSMISSION SYSTEM

[75] Inventor: Kenichi Uetani, Inazawa, Japan

[73] Assignee: Mitsubishi Denki Kabushiki Kaisha, Japan

[21] Appl. No.: 829,028

[22] Filed: Feb. 14, 1986

[30] Foreign Application Priority Data

Feb. 19, 1985 [JP] Japan .................................. 60-30846

[51] Int. Cl.[4] ............................................. H04K 1/10
[52] U.S. Cl. ......................................... 375/38; 371/1;
380/48
[58] Field of Search ...................... 375/38, 118; 371/1, 371/68; 178/69.1; 179/175.2 C; 178/22.17

[56] References Cited

U.S. PATENT DOCUMENTS 3,456,237 7/1969 Collins ..................................... 371/1
3,728,679 4/1973 McIntosh ............................... 371/1
4,024,498 5/1977 McIntosh ............................... 371/1
4,172,963 10/1979 Belcher et al. ....................... 375/108
4,208,544 6/1980 Burke, Jr. ..................... 179/175.2 C
4,520,483 5/1985 Arita et al. ............................ 371/68

Primary Examiner—Robert L. Griffin
Assistant Examiner—Stephen Chin
Attorney, Agent, or Firm—Leydig, Voit & Mayer

[57] ABSTRACT

In a transmission system wherein a group of parallel signals are transferred through circuit elements having a dispersion in the operating time intervals thereof, such as a bank of relays connected in parallel, a read decision signal is generated after lapse of a period of time in which the circuit elements complete the operations thereof, and the parallel signals are read on the basis of the read decision signal. Thus, even when the circuit elements of the dispersive operating time intervals are included in the transmission line of the signals and these signals can be received correctly.

5 Claims, 8 Drawing Figures

SIGNAL TRANSMISSION SYSTEM

BACKGROUND OF THE INVENTION

This invention relates to a signal transmission system for transmitting signals through circuit elements generating a dispersion, such as make-and-break contacts.

In recent years, various such apparatuses have been constructed using microprocessors or microcomputers. Usually, the signal transmission between the apparatuses constructed of the microcomputers is performed by a transmission system which employs dedicated elements, for the Serial Transmission Element 8251A from Intel Inc. With these transmission elements, the transmission is based on clock pulses of fixed period, and a problem concerning the delay time of the signal transmission is hardly posed.

However, regarding the transmission among many sorts of apparatuses as in, for example, an overall monitoring system described in the official gazette of Japanese Utility Model Registration Application Laid-open No. 58-127064, the transmission among the apparatuses which are per se constructed of microcomputers or computers employs a method wherein voltages are raised and then transmitted through make-and-break contacts in order to increase the noise bearing capacity.

FIGS. 7 and 8 show a signal transmission system in a prior art.

Referring to the figures, letter T designates a driver unit which generates ON-OFF signals, and letter R a receiver unit which receives the signals transmitted by the driver unit T. Symbol T1 denotes a chip select signal of the transmission port of the driver unit T, and symbol R1 represents a chip select signal of the receiver unit R. Symbol T2 denotes a write signal from a central processing unit (hereinbelow, abbreviated to 'CPU'), while symbol R2 denotes a read signal from a CPU. Symbols T3 and R3 indicate data buses for the driver unit T and the receiver unit R, respectiely. An AND element T4 is supplied with the chip select signal T1 and the write signal T2 as inputs, while another AND element R4 is inputted with the chip select signal R1 and the read signal R2. Latch circuits T11-T18 store data of 1 byte delivered to the data bus T3 of the CPU, when the output of the AND element T4 is an enable signal. Sending microrelays T21-T28 convert the output signals of the latch circuits T11-T18 into contact signals, respectively. Receiving microrelays R21-R28 receive the contact signals from the microrelays T21-R28, respectively. Gate circuits R11-R18 supply the data bus R3 with the contact signals of the respective receiving microrelays R21-R28 when the output of the AND element R4 is enabled. Symbol (−) denotes a low negative pole of a D.C. source, and symbol (+L) denotes a positive pole thereof, for which 5 volts is employed by way of example. Symbol (+H) denotes a high positive pole for which 24 volts is employed by way of example. Symbol CBL denotes cables which connect the driver unit T and the receiver unit R.

Next, the operation of the prior-art system will be described.

When the chip of the driver unit T is selected to become a write timing, the enable signal is provided from the AND element T4, and the 8-bit (1-byte) data of the data bus T3 is stored in the latch circuits T11-T18. The sending microrelays T21-T28 are electromagnetic relays operative responsive to the energization of the relay coils which depends on the stored contents of the latch circuits T11-T18. A high voltage level from the latch circuit representing a 1-bit will energize the relay coil to engage the contacts of the relay to provide a high voltage level as an ON signal. On the contrary, a low voltage level from the latch circuit will render the relay coil inoperative and, in turn, the contacts remain separate, providing a low voltage level as an OFF sigal. The ON and OFF signals are then transmitted to the receiver unit R through a transmission medium represented in FIG. 7 as cables CBL. On the receive side, the relay coils of the receiving microrelays R21—R28 are correspondingly energized in response to the ON or OFF signals transmitted from the driver unit T. An ON signal representing a 1-bit will activate the microrelay to produce a voltage level (+L) at its output by engaging its contacts. An OFF signal representing an O-bit, on the other hand, will render the microrelay inoperative and zero voltage is produced at its output. Similarly, as in the driver unit T, the voltage level (+L) denotes a 1-bit while the zero voltage level denotes an O-bit.

When the chip of the receiver unit R is selected to become a write timing, the enable signal is provided from the AND element R4, and the voltage level outputs from the receiving microrelays R21-R28 are received at the latched circuits R11-R18 which in turn output the bit information onto the data bus R3.

However, in the circuit shown in FIG. 7, the operations of the sending microrelays T21-T28 and the receiving microrelays R21-R28 disperse. This will be explained with reference to FIG. 8.

In the figure, b0-b6 indicate bit signals, and the sending microrelays T21-T28 operate in response to the signals of 1 byte from the CPU. b10-b16 similarly indicate bit signals, and the receiving microrelays R21-R27 operate in response thereto respectively. The operating states of the sending microrelay T28 and the receiving microrelay R28 shall be omitted from the description.

It is now assumed that the CPU on the sending side have judged to deliver the signals at a time TA indicated in FIG. 8. When the bit signals are fed on the data bus T3 and the enable signal is further generated by the AND element T4, the latch circuits T11-T17 store the bit signals (since the period of time taken from the judgement of the delivery by the CPU till the storing operations of the latch circuits T11-T17 is very short and the operations disperse little, the time TA may well be deemed a time at which the latch circuits T11-T17 have stored the bit signals). The sending microrelay T21 operates at a time t0 and provides a low level signal (hereinbelow, termed 'L signal'), on the basis of which the receiving microrelay R21 provides an L signal at a time t10. The other signals similarly become L signals at times t5→11—t5→t15, respectively. The bit signal b16 becomes a high level signal (hereinbelow, termed 'H signal') at a time t6, whereupon the receiving microrelay R27 provides an H signal at a time t16.

Here, it is assumed that the receiving microrelay R25 operate fastest with:
Operating time interval $$LT_{min} = \text{Time t14} - \text{Time TA} \tag{1}$$

It is also assumed that the receiving microrelay R26 operate most slowly with:
Operating time interval $$LT_{max} = \text{Time t15} - \text{Time TA} \tag{2}$$

Then, the dispersion of the operating time intervals OFF(t) in which the bit signals b10–b16 turn from the H signals to the L signals becomes:

$$OFF(t) = LT_{min} - LT_{max} \quad (3)$$

Likewise, the dispersion of the operating time intervals ON(t) in which the bit signals b10–b16 turn from the L signals to the H signals becomes as follows:

$$ON(t) = HT_{min} - HT_{max} \quad (4)$$

where
$HT_{min}$: minimum operating time interval,
$HT_{max}$: maximum operating time interval.

Accordingly, the dispersion of the time intervals in which the signals of 1 byte have been transmitted is as follows:

$$TD_{min} - TD_{max} \quad (5)$$

where
$TD_{min}$: time interval of the smaller one of $LT_{min}$ and $HT_{min}$
$TD_{max}$: time interval of the greater one of $LT_{max}$ and $HT_{max}$ In order to read a correct signal, therefore, the receiver unit R must perform a reading operation at or after a time TC at which at least the time interval $TD_{max}$ has lapsed since the time TA.

Assuming that the receiver unit R have read the signals of 1 byte at a time before the lapse of the time interval $TD_{max}$, for example, at a time TB as indicated in FIG. 8, the bit signals b12 and b15 do not become the L signals yet, and an erroneous signal is transmitted. This incurs the following drawback in, for example, a system wherein the cage position of an elevator is sent with binary signals of bits 0–6. At the time TA in FIG. 8, the position is a floor 3FH in the hexadecimal system (H indicates the hexadecimal system, and 3F corresponds to the bit signal b0–b6, namely 0111111 or 63 in the decimal system), whereas at the time TB, it becomes a floor 64H (corresponding to 1100100 bit values of bit signal b10–b16 or 100 in the decimal system), so that the cage position signal is not transmitted correctly.

With the prior-art signal transmission system constructed as described above, in case of transmitting a signal through a device, e.g., a made-and-break contact which is lower in the operating speed than a CPU, the CPU has sometimes read the state in which the contact is operating and is not stabilized yet. This has led to the problem that the signal is not received correctly.

SUMMARY OF THE INVENTION

This invention has been made in order to eliminate the problem described above, and has for its object to provide a system in which, in case of sending a signal through a device of slow operation, the signal is read only when the operating period of the device has elapsed, whereby the signal is correctly received.

The signal transmission system according to this invention comprises detection means to detect the change of a signal, a converter which converts the signal into parallel signals and then transmits the parallel signals through circuit elements having a dispersion in the operating time intervals thereof, read decision signal generating means to generate a read decision signal after lapse of the maximum operating time interval of the circuit elements, and reading means to read the parallel signals in accordance with the generation of the read decision signal.

According to the signal transmission system of this invention, after the operations of the circuit elements have been completed, the read decision signal is generated, and the parallel signals are read.

BRIEF DESCRIPTION OF THE DRAWINGS

FIGS. 1–5 show an embodiment of a signal transmission system according to this invention, in which
FIG. 1 is a general arrangement diagram,
FIG. 2 is a block diagram of electric circuitry,
FIG. 3 is a flow chart of a program on a sending side,
FIG. 4 is a flow chart of a program on a receiving side and
FIG. 5 is a diagram for explaining the states of signals.
FIGS. 7 and 8 show a prior-art signal transmission system, in which
FIG. 7 is a connection diagram of electric circuitry and FIG. 8 is a diagram corresponding to FIG. 5.

In the drawings, the same symbols denote identical or corresponding portions.

PREFERRED EMBODIMENTS OF THE INVENTION

Figure 1:
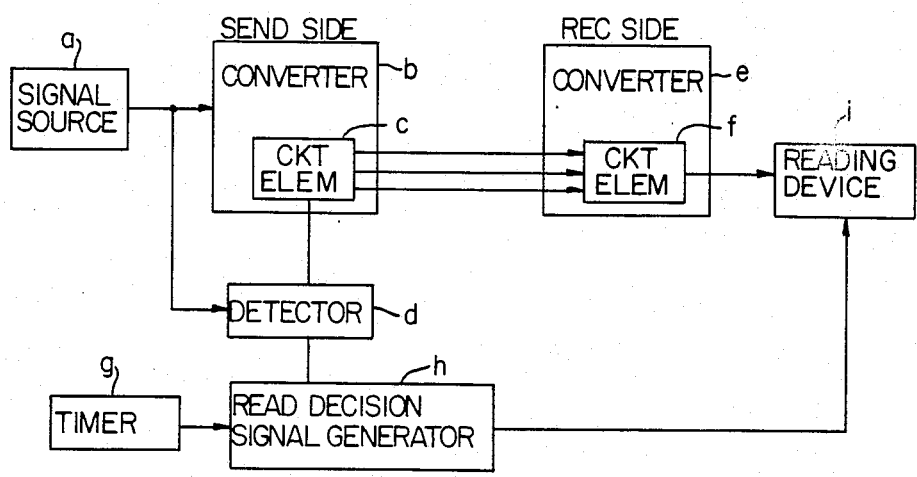

FIG. 1 is a general arrangement diagram of one embodiment of this invention. An external signal from a signal source a is converted into a group of parallel signals by a converter b. When the external signal changes, the change is detected by detection means d, and the circuit elements c of the converter b are actuated to send the parallel signals. The parallel signals are received by the circuit elements f of a converter e on a receiving side. In addition, when a period of time from the detection of the change to the completion of the operations of the circuit elements f is detected through a timer g, a read decision signal is produced from read decision signal generating means h so as to cause reading means i to read the signals of the circuit elements f.

FIGS. 2–5 show an example in the case where this invention is applied to an elevator.

Figure 4:
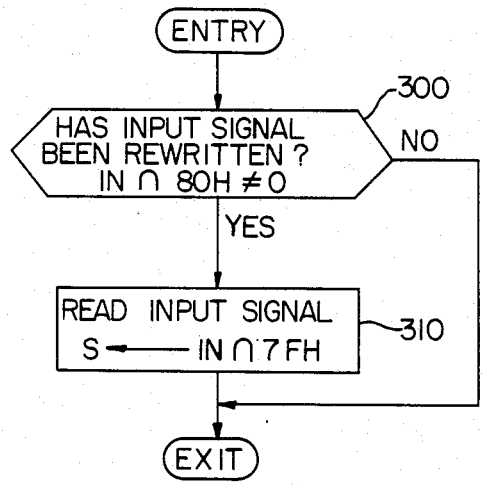
Figure 2:
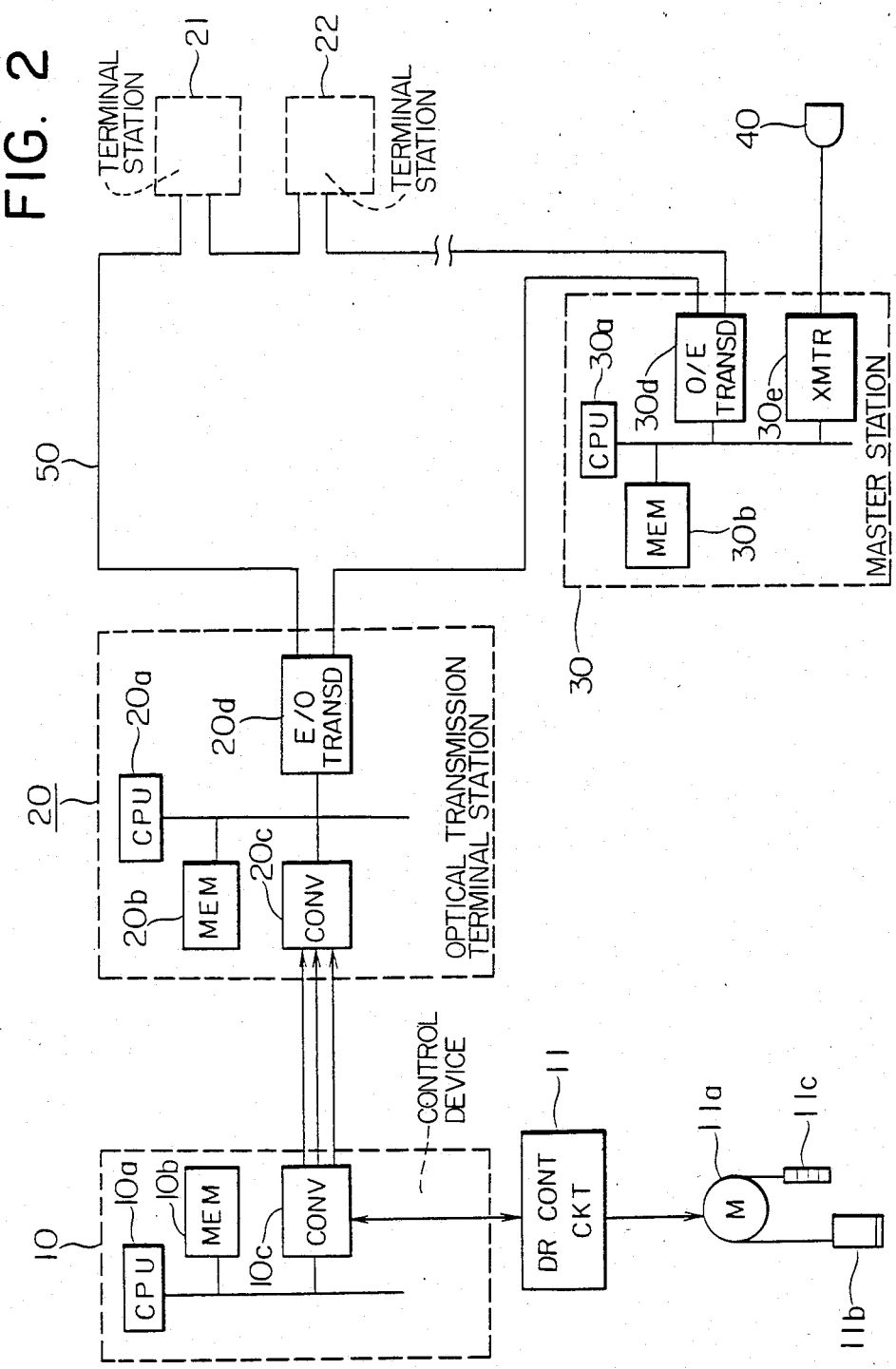
Figure 3:
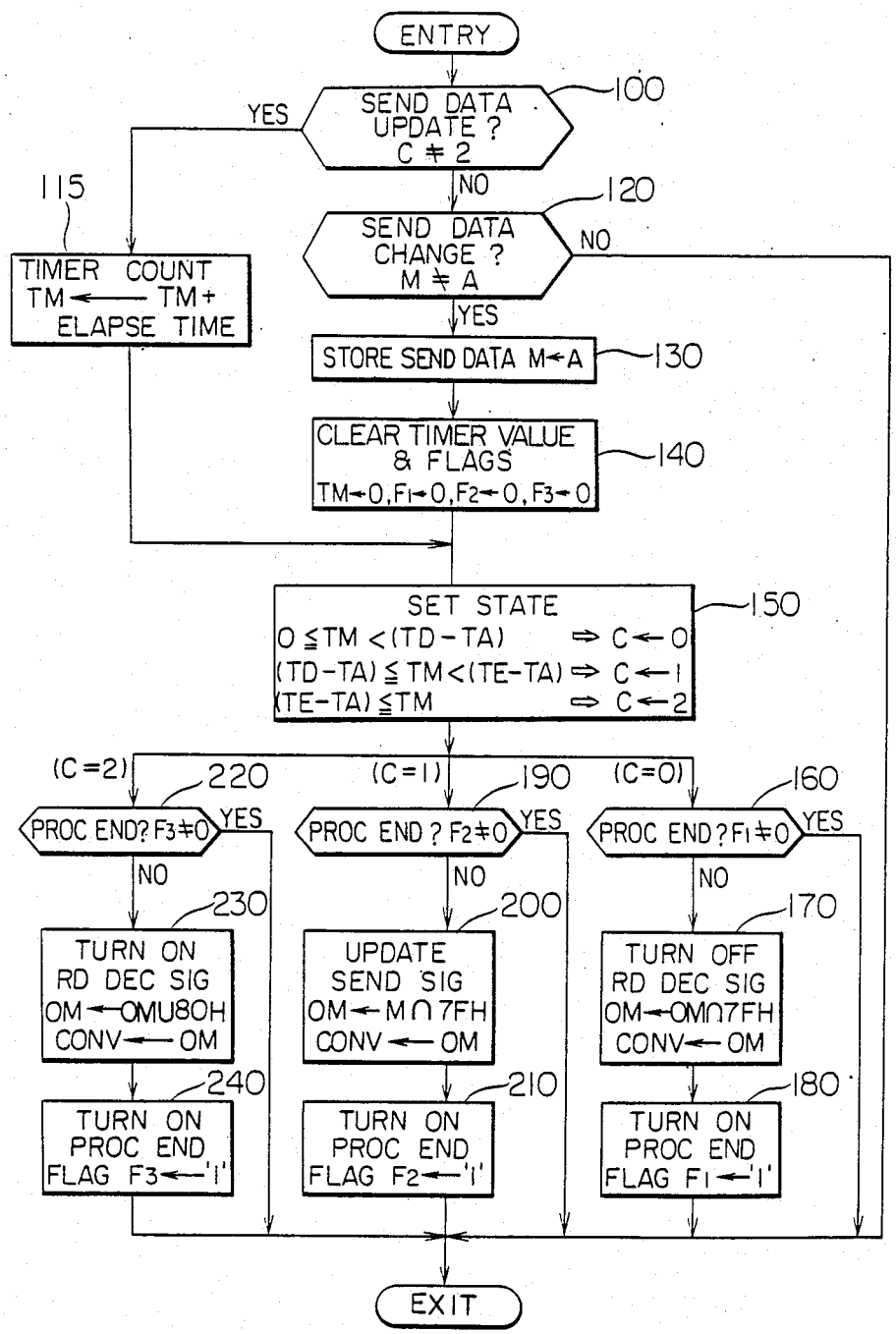

Referring first to FIG. 2, numeral 10 designates the control device of the elevator, which comprises a CPU 10a, a storage 10b for storing a program shown in FIG. 3, and a converter 10c for transferring signals to and from external devices. Numeral 11 designates a drive control circuit, which controls a hoisting motor 11a thereby to control the ascent and descent of a cage 11b as well as a counterweight 11c. An optical transmission terminal station 20 receives the state signal of the elevator from the converter 10c, and it converts this state signal into an optical transmission signal and puts the latter on an optical cable 50. It comprises a CPU 20a, a storage 20b in which a program shown in FIG. 4 is stored, a converter 20c by which the signal from the control device 10 of the elevator is converted into the internal signal of the microcomputer, and an E/O (electrooptic) transducer 20d which converts an electric signal into an optical signal and puts the latter on the optical cable 50. Shown at numerals 21 and 22 are optical transmission terminal stations which are respectively connected to the optical cable 50. Each of them has the same arrangement as that of the optical transmission terminal station 20, and transmits the position of another cage of the elevator.

An optical transmission master station 30 receives the state signals of the elevator sent from the optical transmission terminal stations 20, 21 and 22. Likewise to each of the terminal stations 20, 21 and 22, the master station 30 has a CPU 30a, a storage 30b and an O/E transducer 30d which converts an optical signal into an electric signal. Further, it is furnished with a transmitter 30e which controls a display (hereinbelow, termed 'CRT') 40 for displaying the state of the elevator.

Next, the operation of the example will be outlined before being described in detail.

The position of the cage 11b of the elevator is detected by the drive control circuit 11. Each time the cage position signal changes, the CPU 10a reads the change through the converter 10c and stores it in the storage 10b. Further, this cage position signal is sent from the converter 10c through the converter 20c to the storage 20b to be stored therein, and it is put on the optical cable 50 through the E/O transducer 20d under the control of the CPU 20a. Under the control of the CPU 30a, the cage position signal is stored in the storage 30b through the O/E transducer 30d. Further, the cage position is displayed on the CRT 40 through the transmitter 30e.

Cage position signals from the optical transmission terminal stations 21 and 22 are similarly sent and displayed on the CRT 40.

Here, the transmission between the E/O transducers 20d and 30d is serial transmission based on pulse signals. Accordingly, the problem of ununiform operations is not involved unlike a system wherein a plurality of signals are transmitted in parallel and wherein the combination thereof forms one content.

From the converter 10c, one content is coded into signals of 1 byte. That is, eight signals are transmitted in parallel and reach the converter 20c. On this occasion, a dispersion in time attributed to the operation delays of microrelays arises before the signals are stabilized. According to this invention, accurate reading can be performed by avoiding the transient state.

Figure 5:
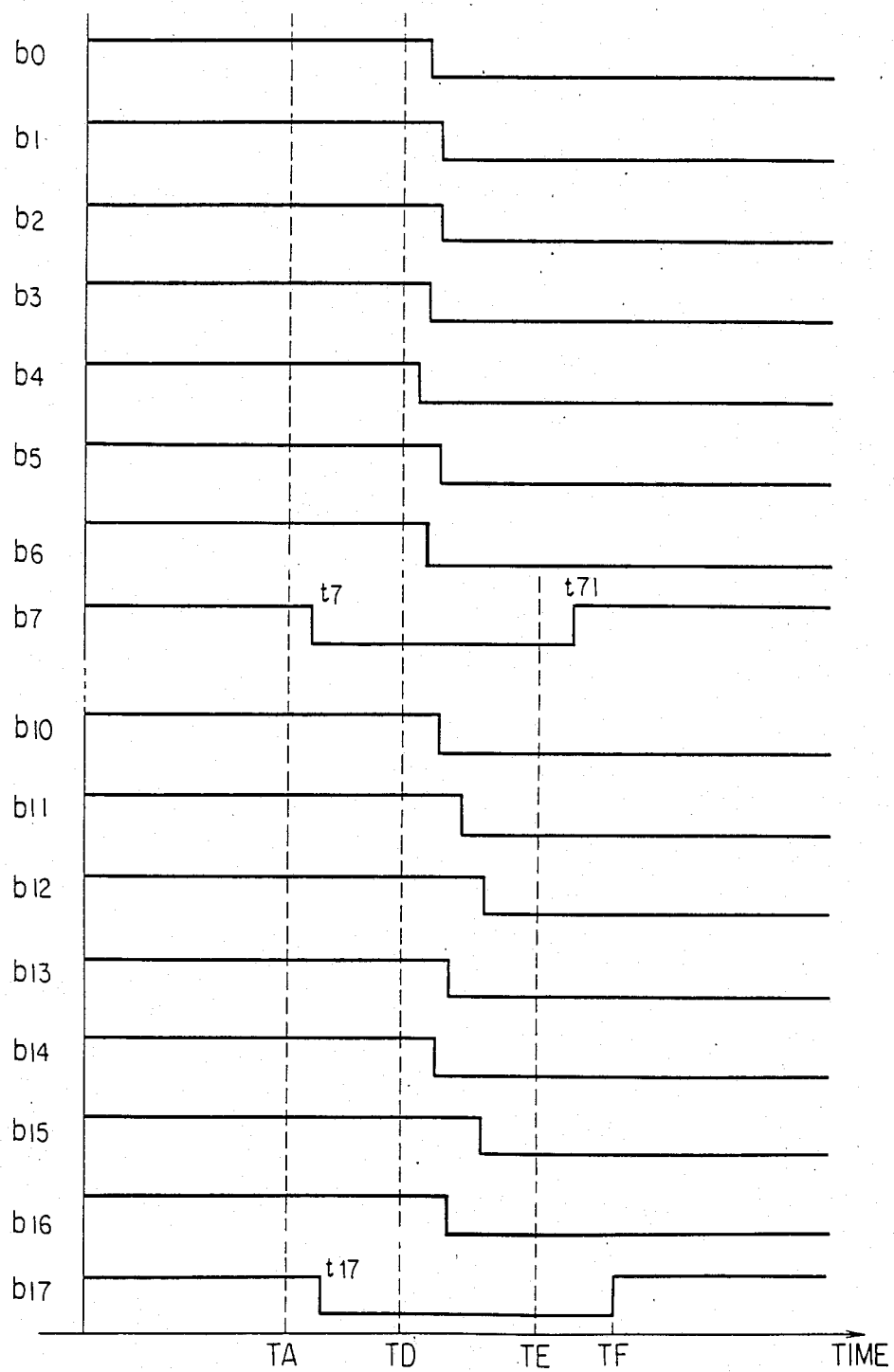

In FIG. 5, symbols b0–b7 denote bit signals which are output from the converter 10c, and symbols b10–b17 denote bit signals which are output from the converter 20c and which operate in correspondence with the respective bit signals b0–b7. Among the bit signals, those b0–b6 and b10–b16 transmit the cage position signal, and those b7 and b17 correspond to the read decision signal.

The CPU 10a detects the change of the cage position signal, and gives at a time TA the command of bringing the bit signal b7 from an H (high) signal to an L (low) signal. The bit signal b7 becomes the L signal at a time t7, and the bit signal b17 becomes the L signal at a time t17. Here, the bit signal b17 necessarily becomes the L signal after the time interval $TD_{max}$ from the time TA as understood from Eq. (5). Accordingly, a sending command is issued from the CPU 10a at a time TD which is later than the time TA by at least the time interval $TD_{max}$. On the basis of this command, the bit signals b0–b6 change, and further the bit signals b10–b16 change. Also in this case, the bit signals b10–b16 complete their operations after the time interval $TD_{max}$ from the time TD. Therefore, at a time TE after lapse of at least the time interval $TD_{max}$ from the time TD, a command is issued from the CPU 10a so as to render the bit signal b7 and H signal again. On the basis of this command, the bit signal b7 becomes the H signal at a time t71, and further the bit signal b17 becomes the H signal at a time TF. At this time TF, the transient state is over. Accordingly, upon detecting the H signal of the bit signal b17, the CPU 20a reads the bit signals b10–b16 as the cage position signal.

A practicable example for realizing the above transmission method will be described more in detail in conjunction with flow charts shown in FIGS. 3 and 4.

FIG. 3 is the flow chart of the program in the control device 10 of the elevator. The program concerns the generation of the cage position signal as well as the read decision signal, and the identifiers of variables described are as follows:

C: Flag for deciding Process state,
A: Cage position signal,
M: Memory of Storage 10b for Cage position signal,
TM: Timer for counting Time interval elapsed since start of sending (Time TA),
$F_1$, $F_2$, $F_3$: Flags for deciding Process ends,
OM: Memory of Storage 10b for output.

The variables are assumed to be initialized as follows:
Memory OM = Cage position signal A
Process state deciding flag C = 2
Memory M = Cage position signal A A step 100 decides whether or not sending data by the converter 10c is being updated, that is, whether or not the flag C≠2 holds. When the process state is initialized, the flag C = 2 holds, and hence, the decision is 'NO' and is followed by a step 120. At the step 120, the cage position signal A from the drive control circuit 11 is compared with the content of the memory M. When the cage position signal is initialized, M = A holds, and hence, the compared result is 'NO' to end the control flow. When a new cage position signal A is input, M≠A holds, and the control flow shifts to a step 130. Here, the cage position signal A is written in the storage 10b, and M = A holds. A step 140 sets the timer TA and the flags $F_1$–$F_3$ to zero, and shifts to a step 150.

(i) For $0 \leq$ Timer signal TM $<$ (TD−TA):

Since the timer signal TM = 0 has been established at the step 140, the flag C is set to C = 0 at the step 150, which is followed by a step 160. When the flag $F_1 \neq 0$ holds, the control flow jumps to the exit thereof, and when $F_1 = 0$ holds, that is, when the process is not ended yet, the control flow shifts to a step 170. At this step, the logical product (AND) between the output memory OM and a value 7FH (where H signifies that '7F' is a hexadecimal number of the values of bits $b_0$–$b_7$, namely, and the same applies hereinbelow) is taken every bit and is stored in the memory OM, and this value is output through the converter 10c. That is, the bit signal b7 is output as the L signal at the time t7 as shown in FIG. 5. At a step 180, the flag $F_1$ is set to $F_1 = 1$, whereupon the control flow ends.

(ii) For (TD−TA) $\leq$ Timer signal TM $<$ (TE−TA):

At the step 100, the flag C is set to C = 0 as stated in the item (i). Therefore, this step is followed by a step 115 at which the timer signal TM is updated, and which is followed by the step 150. It is assumed that, at this time, (TD−TA) $\leq$ timer signal TM $<$ (TE−TA) hold. The flag C = 1 is set, and the control flow shifts to a step 190. When the flag $F_2 \neq 0$ holds, the control flow jumps to the exit, and when $F_2 = 0$ holds, that is, when the process is not ended yet, the control flow shifts to a step 200. At this step, the logical product between the cage position of the memory M and the value 7FH is taken every bit and is stored in the memory OM, and the value is output through the converter 10c. That is, the bit signal b7 is the L signal, and the new cage position signal is sent with the bit signals b0–b6. The flag $F_2$ is set to $F_2=1$ at a step 210, and the control flow ends.

(iii) For (TE−TA)<Timer signal TM:

At the step 100, the flag C is set to C=1 as stated in the item (ii). Therefore, this step is followed by the step 115, at which the timer signal TM is further updated and which is followed by the step 150. It is assumed that (TE−TA)≦TM hold at this time. The flag C=2 is set, and the control flow shifts to a step 220. When the flag $F_3 \neq 0$ holds, the control flow jumps to the exit, and when $F_3=0$ holds, that is, when the process is not ended yet, the step 220 is followed by a step 230. At this step, the logical sum between the memory OM and a value 80H is taken every bit and is stored in the memory OM, and the value is output through the converter 10c. That is, the bit signal b7 is rendered the H signal and is output at the time t71 as shown in FIG. 5. At a step 240, the flag $F_3$ is set to $F_3=1$.

As thus far described, the bit signals b0–b7 are output as shown in FIG. 5 by the program of FIG. 3.

Next, FIG. 4 is the flow chart of the program stored in the storage 20b.

The cage position signal and the read decision signal sent from the converter 10c with the bit signals b0–b7 are converted by the converter 20c into a reception signal IN consisting of the bit signals b10–b17. At a step 300, the reception signal IN has the logical product taken with the value 80H every bit, and whether or not the result is zero is checked. That is, the bit signal b17 corresponding to the bit signal b7 is examined. When it is the L signal, the decision becomes 'NO', and the control ends. When it is the H signal, the control flow proceeds to a step 310 at which the reception signal IN and the value 7FH are subjected to the logical product every bit. That is, the bit signal b17 is set to the L signal and becomes internal data S, which is put on the data bus of the CPU 20a. The internal data S is sent to the optical transmission master station 30 through the optical cable 50, and is displayed on the CRT 40.

According to the above embodiment, the bit signal b7 is first rendered the L signal, the bit signals b0–b6 are sent after the bit signal b17 on the receiving side corresponding to the bit signal b7 has reliably become the L signal, the bit signal b7 is rendered the H signal after a time interval in which the bits b10–b16 receiving the bit signals b0–b6 complete the operations has lapsed, and the bit signals b10–b16 are read after the bit signal b17 responsive to the bit signal b7 has become the H signal. Therefore, even when the operations of the transmission system involve a dispersion, the signal is correctly transmitted.

In the foregoing embodiment, the time TE is set to be later than the time TD by the time interval $TD_{max}$. Since, however, the bit signal b17 being the read decision signal has already become the L signal, the time TE may well be set earlier by the time interval $TD_{mini}$ indicated in Eq. (5).

Figure 6:
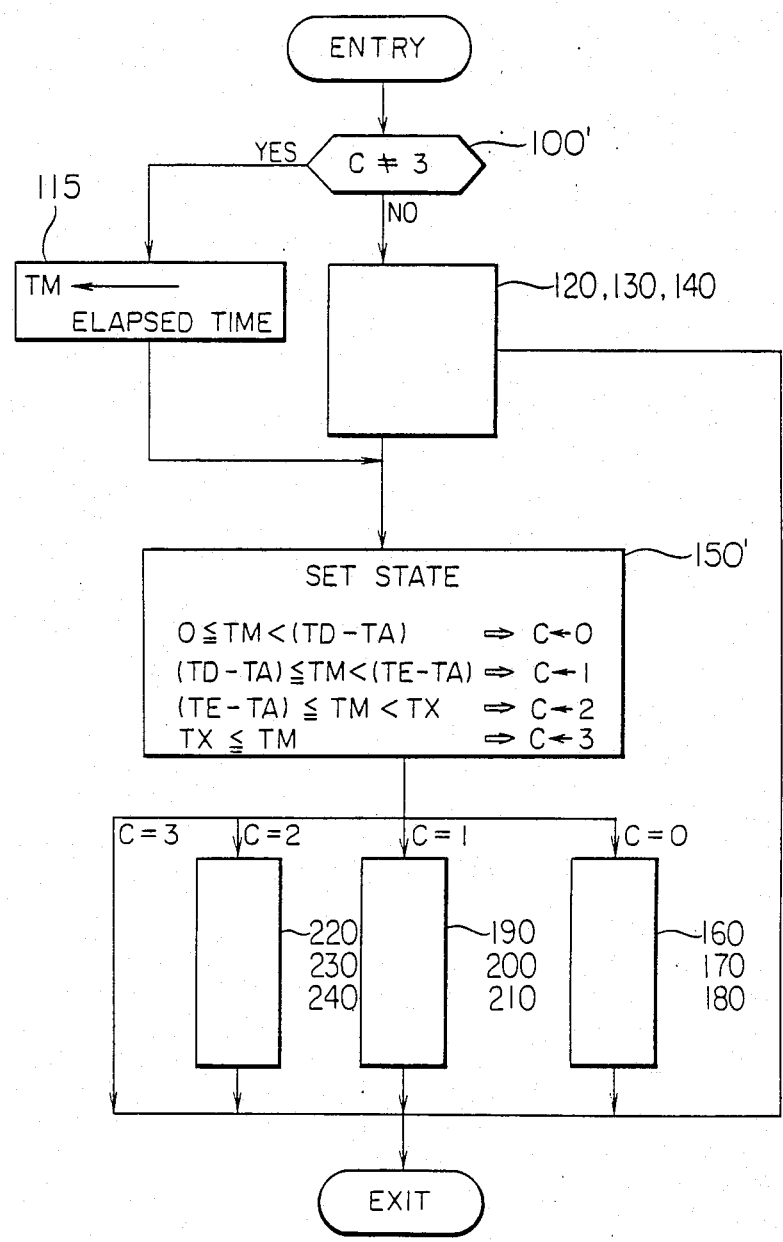
FIG. 6 is a diagram corresponding to FIG. 3, showing another embodiment of this invention.
Figure 7:
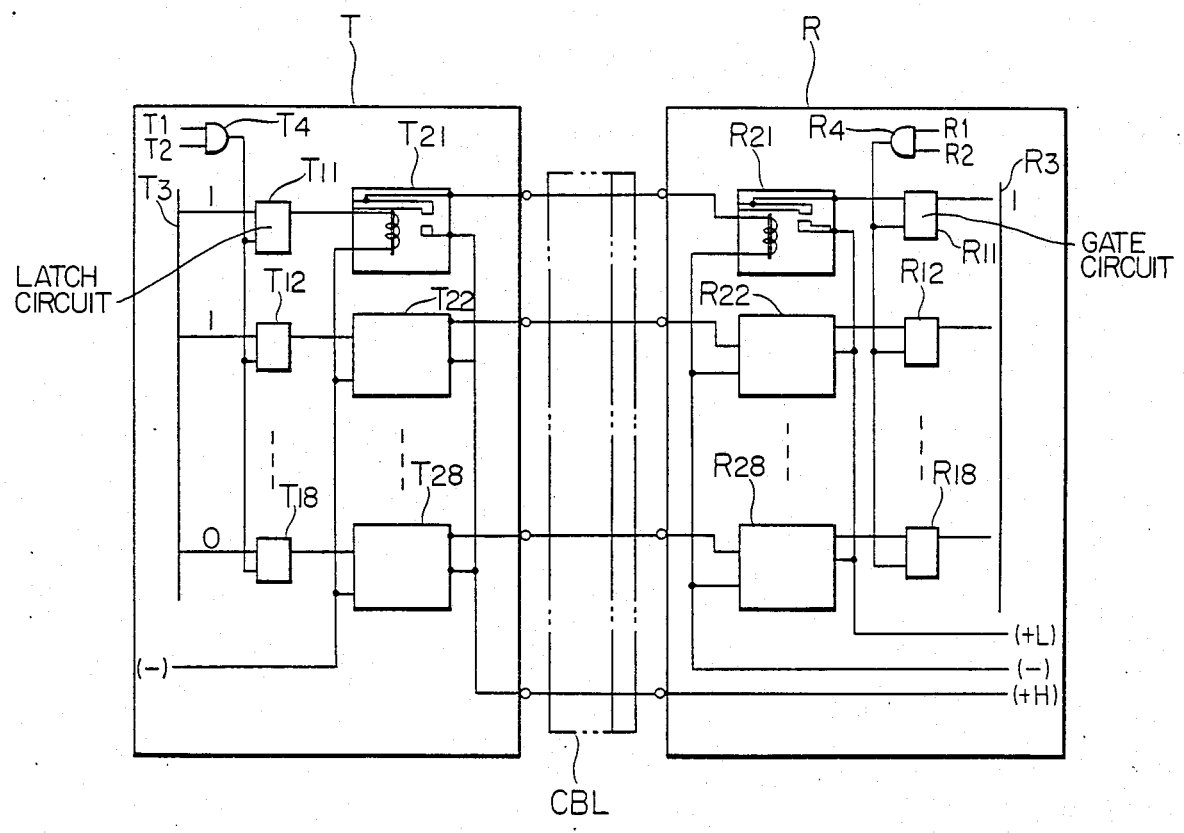
Figure 8:
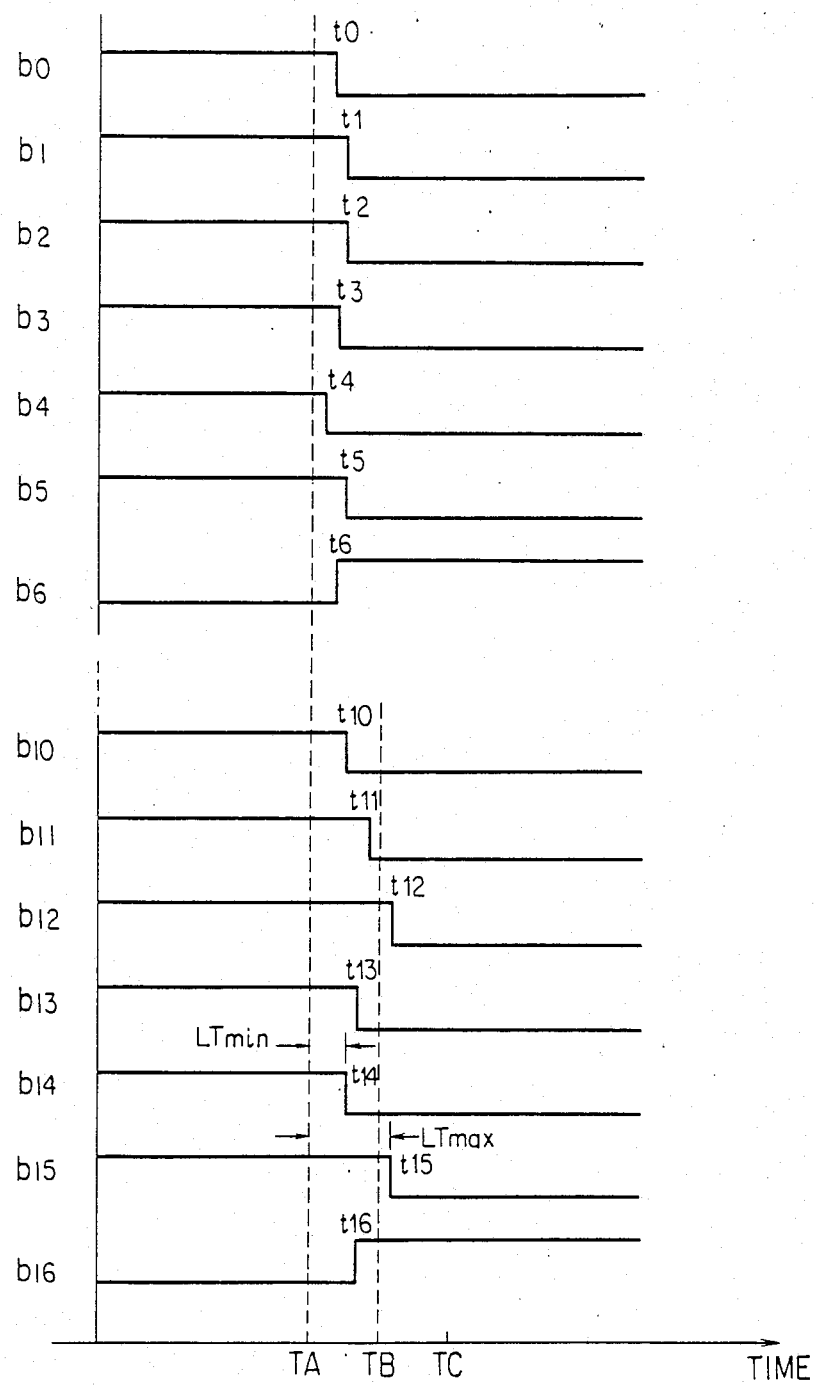

FIG. 6 shows another embodiment of this invention, in which the same symbols as in FIG. 3 indicate identical means.

By way of example, the embodiment shown in FIG. 2 can undergo a situation where, as the speed of the cage 11b is high, the cage position displayed on the CRT 40 changes illegibly fast. The embodiment of FIG. 6 improves this drawback.

An updating cycle TX is set for displaying the cage position on the CRT 40 in such a period that man can read it.

(iv) For O≦Timer signal TM<Updating cycle:

The system operates as stated in the items (i), (ii) and (iii) before the updating cycle TX is reached after the detection of M≠A at the step 120 and the setting of the timer signal TM to zero at the step 140. That is, the timer signal TM is continued to be updated via the processes of the steps 100'–115–150', and the processes of the flag C=0, 1 and 2 are performed according to the updated values. Accordingly, even when the cage position has changed before the updating period TX is reached, the cage position signal is not sent.

(v) For Updating cycle TX≦Timer signal TM:

The flag C=3 is set at the step 150', whereupon the control flow leads to the exit thereof immediately. When the control flow has thereafter come to the step 100' anew, it shifts to the step 120 owing to the decision of 'NO', and the change of the cage position signal is monitored.

With the embodiment shown in FIG. 6, the intended object is achieved, and besides, even when the cage position changes fast, it is sampled every updating cycle TX and the signal thereof is sent, so that the cage position can be read on the CRT 40.

As described above, this invention consists, in a transmission system wherein a group of parallel signals are transferred through circuit elements having a dispersion in the operating time intervals thereof, in that a read decision signal is generated after lapse of a period of time in which the circuit elements complete the operations thereof and that the parallel signals are read on the basis of the read decision signal. This brings forth the effect that the signals can be accurately transmitted even when the circuit elements of the dispersive operating time intervals are included in the transmission line of the signals.

What is claimed is:

1. A signal transmission system for transmitting source signals through dispersed circuit elements comprising a signal source for generating said source signals, detection means receiving said signal for detecting a change in said signals and for generating an output detection signal, a transmitting converter including a plurality of circuit elements for converting said source signals into a group of parallel signals and for transmitting said parallel signals when said circuit elements are actuated in response to said detection signal, said circuit element having a dispersion in operating time interval, read decision signal generating means for generating a read decision signal after lapse of the time interval, determined by the longest transient switching time of any one of said circuit elements, following the generation of the detection signal, a receiving converter receiving said parallel signals for converting the same into reception signals, and reading means for reading said reception signals of said converter when the read decision signal has been generated.

2. A signal transmission system according to claim 1 wherein said transmitting and receiving converters include a plurality of transmitting and receiving relays having contacts and connected in parallel and respectively convert said source signals and said parallel signals by the opening and closing of said contacts.

3. A signal transmission system according to claim 2 wherein said transmitting converter activates said transmitting relays upon the generation of said detection signal and said receiving converter activates said receiving relays in response to the operation of said transmitting relays.

4. A signal transmission system according to claim 2 wherein said read decision signal generating means generates a signal for preventing the reading of said reception signals after the generation of the detection signal and before the operation of said transmitting relays, and thereafter generates a read decision signal after lapse of the maximum operating time interval, and wherein said converters operate said relays within a period during which the signal for preventing the reading is generated.

5. A signal transmission system according to claim 4 wherein said converters operate said relays after the read decision signal has become the reading preventive signal.

* * * * *